(12) United States Patent
Tang et al.

(10) Patent No.: US 8,698,975 B2
(45) Date of Patent: Apr. 15, 2014

(54) PRISM SHEET, BACKLIGHT MODULE AND LIQUID CRYSTAL DISPLAY DEVICE THEREOF

(75) Inventors: Rong Tang, Beijing (CN); Bin Zou, Beijing (CN); Dan Wang, Beijing (CN); Xibin Shao, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 187 days.

(21) Appl. No.: 13/334,815

(22) Filed: Dec. 22, 2011

(65) Prior Publication Data

US 2012/0169965 A1  Jul. 5, 2012

(30) Foreign Application Priority Data

Dec. 29, 2010 (CN) .................. 2010 2 0688429 U

(51) Int. Cl.
*G02F 1/1335* (2006.01)
*G02B 27/10* (2006.01)
*G02B 27/28* (2006.01)
*G09F 13/04* (2006.01)

(52) U.S. Cl.
USPC .......... 349/62; 349/65; 359/625; 359/485.06; 362/97.2

(58) Field of Classification Search
CPC ............. G02F 1/133615; G02F 2001/133607; G02B 6/0068; G02B 6/0038; G02B 6/0053
USPC .......... 349/62, 65; 359/625, 485.06; 362/97.2
See application file for complete search history.

(56) References Cited

U.S. PATENT DOCUMENTS

| | | | |
|---|---|---|---|
| 5,724,108 A * | 3/1998 | Shibata ........................ | 349/62 |
| 7,991,257 B1 * | 8/2011 | Coleman ....................... | 385/129 |
| 2006/0187366 A1 * | 8/2006 | Sugimoto et al. ............... | 349/10 |
| 2006/0262376 A1 * | 11/2006 | Mather et al. .................. | 359/248 |
| 2008/0303777 A1 * | 12/2008 | Inoue et al. .................... | 345/102 |
| 2010/0177380 A1 | 7/2010 | Nagahama et al. ............ | 359/359 |
| 2011/0216416 A1 * | 9/2011 | Kashiwagi et al. ............ | 359/609 |

FOREIGN PATENT DOCUMENTS

JP  2011-159394  *  8/2011  ............. H05B 33/02

* cited by examiner

*Primary Examiner* — Mike Qi
(74) *Attorney, Agent, or Firm* — Ladas & Parry LLP

(57) ABSTRACT

The embodiments of present disclosure disclose a prism sheet, a backlight module and a liquid crystal display device thereof. The prism sheet comprises a first sub-prism sheet and a second sub-prism sheet with faces being closely bonded with each other, the first sub-prism sheet having a plurality of protrusions on the surface being bonded with the second sub-prism sheet, and the second sub-prism sheet having recesses on the surface being bonded with the first sub-prism sheet corresponding to the protrusions, wherein the first sub-prism sheet and the second sub-prism sheet are made of materials having different refractive indexes.

14 Claims, 4 Drawing Sheets

PRISM SHEET, BACKLIGHT MODULE AND LIQUID CRYSTAL DISPLAY DEVICE THEREOF

BACKGROUND

Embodiments of the present disclosure relate to a prism sheet, a backlight module and a liquid crystal display device thereof.

As a kind of flat panel displays, liquid crystal displays (LCDs) comprise liquid crystal which does not emit light by itself, but are provided with backlights to emit light. For example, a backlight module comprises: a molded frame for fixing; a reflective sheet mounted on a lowermost surface for reflecting light to a liquid crystal panel; a light guide plate provided on the reflective sheet for guiding light; a light source provided between the light guide plate and a side wall of the frame for emitting light; a diffusion sheet provided on the light guide plate for making illumination uniform; a prism sheet provided on the diffusion sheet for converging light; a protective sheet for protecting the diffusion sheet and the prism sheet; and other optical film sheets.

Typically, a prism sheet used in a backlight module of a LCD has a triangular cross-section. In order to achieve an effect of light concentration in both horizontal and vertical directions, commonly two prism sheets are provided, with one prism sheet being in the X-direction and the other prism sheet being in the Y-direction respectively. With the two prism sheets, not only the thickness of the backlight module and the number of parts are increased, but also the two prism sheet are more likely to scratch each other; moreover, a limited view angle is caused by the triangular design.

Recently, a kind of a prism sheet, that is, a reverse prism is provided in the related art, which cooperates with a light guide plate having a prism structure. The prism structure on the light guide plate engages with the reverse prism sheet disposed thereon, which can mitigate the mutual scratch degree. However, the contact surfaces for engagement are very small. As a result, it is very possible to run into an unstable engagement.

SUMMARY

The embodiments of the present disclosure can provide a prism sheet, a backlight module and a liquid crystal display device thereof, which can avoid scratches between the prism sheets and an unstable engagement between a prism sheet and a light guide plate when being assembled.

An embodiment of the disclosure provides a prism sheet, which comprises a first sub-prism sheet and a second sub-prism sheet with faces being closely bonded with each other, the first sub-prism sheet having a plurality of protrusions on the surface being bonded with the second sub-prism sheet, and the second sub-prism sheet having recesses on the surface being bonded with the first sub-prism sheet corresponding to the protrusions, wherein the first sub-prism sheet and the second sub-prism sheet are made of materials having different refractive indexes from each other.

In an example, the first sub-prism sheet and the second sub-prism sheet are bonded by coating ultraviolet curing adhesive and curing the adhesive by UV rays.

In an example, the prism sheet further comprises a substrate closely bonded with the bottom surface of the first sub-prism sheet.

In an example, the materials of both the substrate and the first sub-prism sheet are the same.

In an example, the first sub-prism sheet can have a light guide plate as a substrate.

In an example, the protrusions are stripe-shaped protrusions with rectangular bottoms and triangular cross-sections.

In an example, the triangles of the cross-sections of the stripe-shaped protrusions are equilateral triangles, with a side length of no more than 200 μm.

In an example, the protrusions are spherical-shaped protrusions with circular or regular hexagonal bottoms, or the protrusions are pyramid-shaped protrusions with polygonal bottoms.

In an example, the heights and the widths of the bottoms of the protrusions are no more than 200 μm.

In an example, the protrusions are irregular protrusions with inconstant dimensions.

In an example, the adjacent protrusions have intervals therebetween.

In an example, the dimensions of the interval are different from one another in a range of 25 μm~50 μm.

Another embodiment of the disclosure provides a backlight, which comprises the above-described prism sheet.

Still another embodiment of the disclosure provides a liquid crystal display device, which comprises the above-described backlight.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

To describe the technical solutions in the related art and the embodiments of the present disclosure more clearly, the accompanying drawings will be briefly described below for the description of the embodiments of the present disclosure. Apparently, the accompanying drawings are only presented as illustrations to the embodiments of the present disclosure, while other drawings can be obtained by the ordinary skilled in the art without creative efforts.

DETAILED DESCRIPTION

Embodiments of the present disclosure provide a prism sheet, a backlight module and a liquid crystal display device thereof, which can avoid scratches between prism sheets and unstable engagement between a prism sheet and a light guide plate when being assembled.

A prism sheet, a backlight module and a liquid crystal display device thereof in accordance with the embodiments of the present disclosure will be described below in detail in conjunction with the accompanying drawings.

Figure 1:
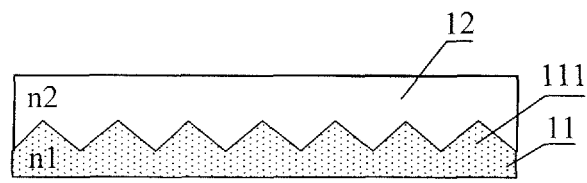
FIG. 1 is a first schematic diagram of an embodiment of the present disclosure.
Figure 2:
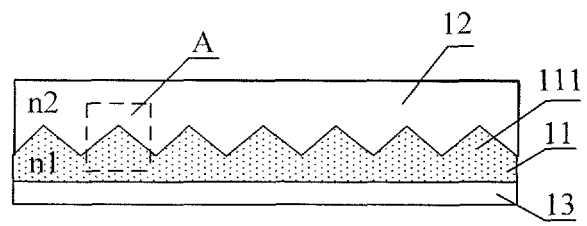
FIG. 2 is a second schematic diagram of an embodiment of the present disclosure.
Figure 3A:
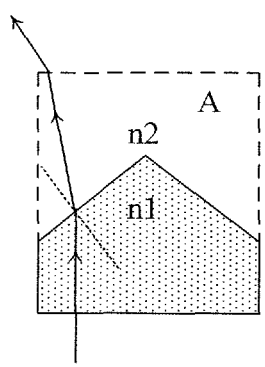
FIG. 3a is a first partially enlarged schematic diagram of the zone A in FIG. 2.
Figure 3B:
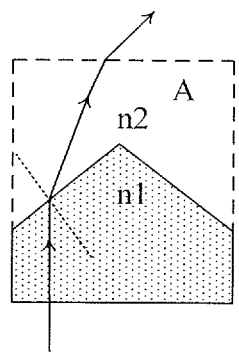
FIG. 3b is a second partially enlarged schematic diagram of the zone A in FIG. 2.

An embodiment of the present disclosure provides a prism sheet, as shown in FIG. 1 and FIG. 2. This prism sheet comprises a first sub-prism sheet 11 and a second sub-prism sheet 12 with surfaces being closely bonded with each other; the first sub-prism sheet 11 has a plurality of protrusions 111 on the surface bonded with the corresponding surface of the second sub-prism sheet 12, and the second sub-prism sheet 12 has recesses on the surface bonded with the corresponding surface of the first sub-prism sheet 11. The recesses of the second sub-prism sheet 12 match with the corresponding protrusions of the first sub-prism sheet 11. Materials of both the first sub-prism sheet 11 and the second sub-prism sheet 12 have different refractive indexes from each other, assuming the refractive index of the first sub-prism sheet 11 is denoted as "n1," the refractive index of the second sub-prism sheet 12 is denoted as "n2", n1≠n2. Where n1<n2, the light path of a light ray is shown in FIG. 3$a$; where n1>n2, the light path of a light ray is shown in FIG. 3$b$.

On the first sub-prism sheet 11, the plurality of protrusions 111 are the prism optical elements. The first sub-prism sheet 11 and the second sub-prism sheet 12 are made of materials with different refractive indexes, for example, polymethylmethacrylate (PMMA) in this embodiment. The first sub-prism sheet 11 and the second sub-prism sheet 12 function together to refract light emitted therein.

The close bonding between the first sub-prism sheet 11 and the second sub-prism sheet 12 can be achieved by way of adhesion, or can be achieved by way of coating ultraviolet-cured adhesive and then curing.

In this embodiment, two sub-prism sheets bonded together as an integrated prism sheet is realized, and one surface of the prism optical element of the first sub-prism sheet is closely bonded with one surface of the prism optical element of the second sub-prism sheet; moreover, the first sub-prism sheet and the second sub-prism sheet have different refractive indexes from each other, which produces the same optical effect of arranging a prism sheet with a triangular cross-section in X-direction or Y-direction and produces a comparatively large view angle; also, in this case a light guide plate is no longer needed to be engaged with a prism structure. In addition, when the protrusions on the surface of the first sub-prism sheet bonded with the second sub-prism sheet is provided along both X-direction and Y-direction of the sheet, there is produced the same optical effect of providing the two orthogonal prism sheets with a triangular cross-section arranged along X-direction and Y-direction respectively. In addition, the surface of the prism sheet facing toward the light guide plate may be a flat surface and thus can be directly laminated on a backlight module assembly, such as a light guide plate and the like, avoiding unstable engagement caused for example by the engagement of a reverse prism sheet and a prism structure of a light guide plate.

Furthermore, as shown in FIG. 2, such a prism sheet may further comprise a substrate 13 closely bonded with the bottoms of the first sub-prism sheet 11. The above prism sheet can be configured in a way that the plurality of protrusions 111 of the first sub-prism sheet 11, i.e., the plurality of optical elements are arranged on the substrate 13. The material of the substrate 13 can be a transparent resin material, for example, polyethylene terephthalate (PET) or polycarbonate (PC).

Figure 4:
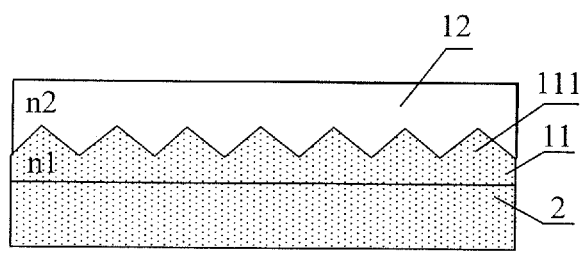
FIG. 4 is a schematic diagram of a prism sheet with a light guide plate as a substrate according to an embodiment of the present disclosure.

Furthermore, the substrate 13 and the first sub-prism sheet 11 can be made of a same material. Furthermore, as shown in FIG. 4, the substrate can also be a light guide plate 2, that is, the first sub-prism sheet 11 can have the light guide plate 2 as a substrate. Thus, the prism sheet by this embodiment is adhered onto the light guide plate 2 to form a single body, which simplifies a backlight module assembling procedure when the whole liquid crystal display device is assembled, also avoids align deviations between the prism sheet and the light guide.

Furthermore, in order to simplify the process, and improve production efficiency, the above-mentioned substrate 13 can be integrally foamed with the first sub-prism sheet 11 when they are produced.

Figure 5:
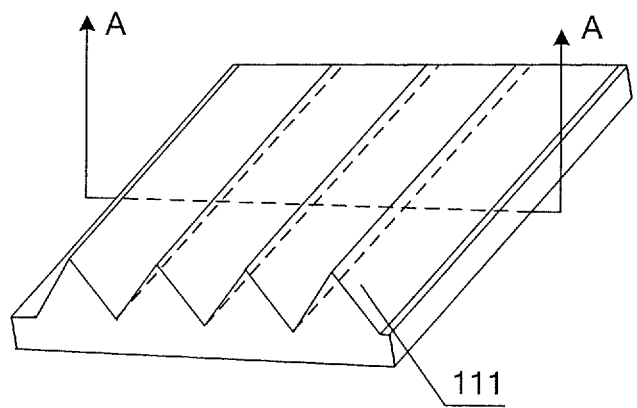
FIG. 5 is a first schematic diagram of the first sub-prism sheet with stripe-shaped protrusions according to an embodiment of the present disclosure.
Figure 6:
FIG. 6 is a sectional view taken along a direction A-A in FIG. 5.

Furthermore, the protrusions 111 on the first sub-prism sheet can be of various shapes, for example, can be stripe-shaped protrusions 111 with rectangle bottoms and triangular cross-sections, as shown in FIG. 5, with the lengths of such stripe-shaped protrusions 111 being equal to the length or width of the first sub-prism sheet; as shown in FIG. 6, and the cross-sections of triangle may be in an equilateral triangle, with the side length no more than 200 μm (microns); as shown in FIG. 2, the protrusions 111 mate with recesses formed on the second sub-prism sheet 12, so that a wider view angle can be obtained, as well as an enhanced light convergence.

Figure 7:
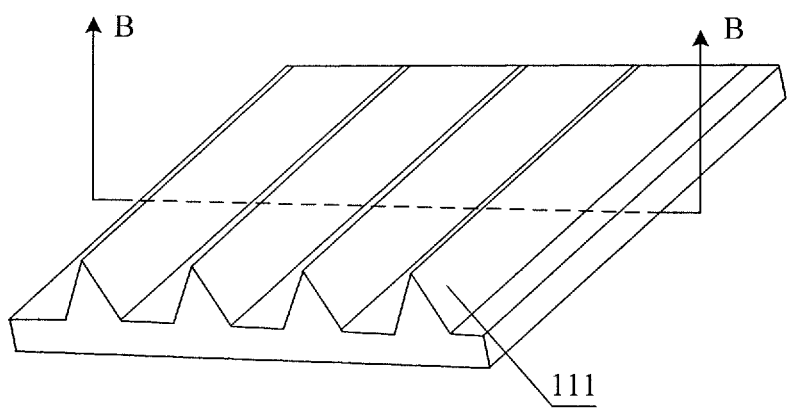
FIG. 7 is a second schematic diagram of the first sub-prism sheet with stripe-shaped protrusions according to an embodiment of the present disclosure.
Figure 8:
FIG. 8 is a sectional view taken along a direction B-B in FIG. 7.
Figure 9:
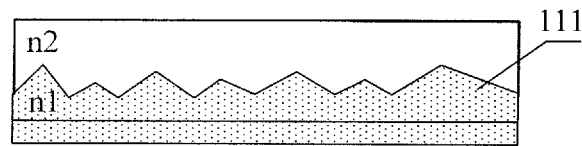
FIG. 9 is a third schematic diagram of the prism sheet according to an embodiment of the present disclosure.

Furthermore, the stripe-shaped protrusions 111 can be regular stripe-shaped protrusions 111 with preset constant dimensions and shapes, as shown in FIG. 2 to FIG. 8, and the regular-shaped protrusions can achieve an excellent effect of light concentration as prism optical elements; such stripe-shaped protrusions 111 may also be irregular stripe-shaped protrusions 111 with different dimensions and shapes, as shown in FIG. 9. Such irregular protrusion may be protrusions with different shapes or lengths of the bottom, or may be protrusions with different shapes or lengths of cross-sections, or may be protrusions with different heights, or can be protrusions of different materials, or the like. The irregular protrusions may be different from one another. The irregular protrusions function as prism optical elements, which can effectively solve mura effects.

Furthermore, the stripe-shaped protrusions 111 can have intervals between the adjacent protrusions, as shown in FIG. 7 and FIG. 8, to prevent pixel units from producing an optical interference phenomenon, i.e., a phenomenon of uneven brightness among pixels.

Figure 10:
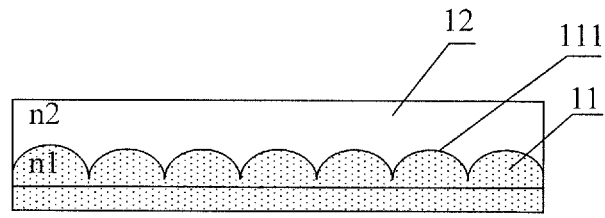
FIG. 10 is a fourth schematic diagram of the prism sheet according to an embodiment of the present disclosure.
Figure 11:
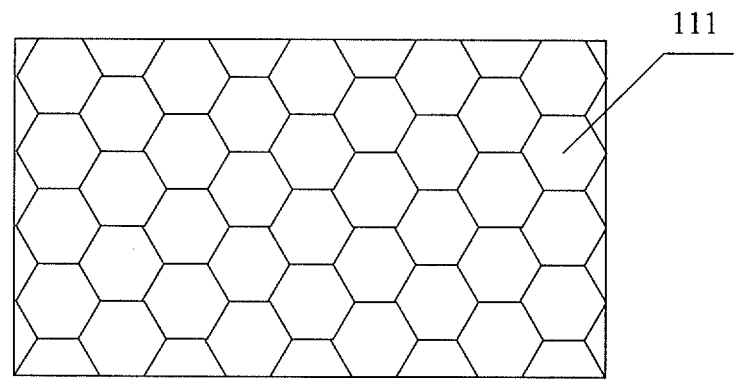
FIG. 11 is a top view of the first sub-prism sheet with spherical-shaped protrusions having regular hexagonal bottoms according to an embodiment of the present disclosure.

In this embodiment, the protrusions 111 can also be spherical-shaped protrusions with circular or regular hexagonal bottoms, and the structure of the prism optical elements of such spherical-shaped protrusions is shown in FIG. 9. FIG. 10 is a top view of spherical-shaped protrusions with regular hexagonal bottoms. Such spherical-shaped protrusions with circular or regular hexagonal bottoms mate with grooves on the second sub-prism sheet 12, which can produce the same optical effect as the two orthogonal prism sheets with a triangular cross-section arranged along X-direction and Y-direction respectively, while avoiding unstable engagement and facilitating assembling, because the spherical-shaped protrusions have an optical structure in both X-direction and Y-direction.

Figure 12:
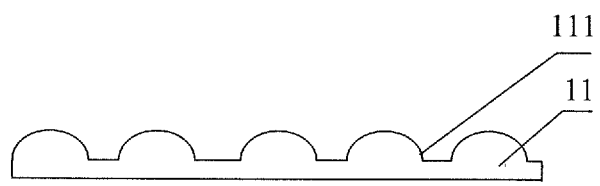
FIG. 12 is a schematic diagram of the first sub-prism sheet with spherical-shaped protrusions according to an embodiment of the present disclosure.

Furthermore, the spherical-shaped protrusions can have intervals among the adjacent protrusions, as shown in FIG. 12, to prevent pixel units from producing an optical interference phenomenon, i.e., a phenomenon of uneven brightness among pixels.

Figure 13:
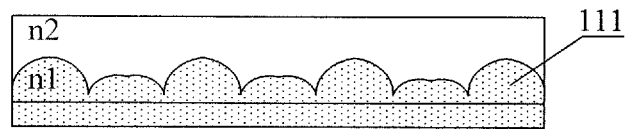
FIG. 13 is a fifth schematic diagram of the prism sheet according an embodiment of the present disclosure.

Furthermore, the spherical-shaped protrusions 111 can be regular spherical-shaped protrusions 111 with constant dimensions and shapes, as shown in FIG. 10, the regular protrusions have an excellent effect of light concentration as prism optical elements; the spherical-shaped protrusions 111 can also be irregular spherical-shaped protrusions 111 with different dimensions or shapes, as shown in FIG. 13. Such irregular protrusion may be protrusions with different shapes or lengths of bottoms, or may be protrusions with different shapes or lengths of cross-sections, or may be protrusions with different heights, or can be protrusions of different materials, or the like. The irregular protrusions may be different from one another. The irregular protrusions as prism optical elements can effectively solve mura effects.

In this embodiment, the protrusions can also be pyramid-shaped protrusions with polygonal bottoms, for example, tetrahedrons with triangular bottoms.

Furthermore, the above-mentioned pyramid-shaped protrusions can be regular protrusions with constant dimensions and shapes, and the regular protrusions have an excellent effect of light concentration as prism optical elements.

The above-mentioned pyramid-shaped can also be irregular protrusion with different dimensions or shapes, and such irregular protrusion may be protrusions with different shapes or lengths of bottom edges, or may be protrusions with different shapes or lengths of the cross-sections, or may be protrusions with inconstant heights, or may be protrusions of different materials, or the like. The irregular protrusions can effectively solve Mura effects as prism optical elements.

Likewise, the above-mentioned pyramid-shaped protrusions can be adjoined with each other, or the protrusions can have certain intervals among the adjacent protrusions. The structure of protrusions having intervals between the adjacent protrusions can prevent pixel units from producing an optical interference phenomenon, i.e., a phenomenon of uneven brightness among pixels.

Moreover, with allowable producing processes, the smaller are the above-mentioned protrusions, including spherical-shaped protrusions and pyramid-shaped protrusions, the better effect can be obtained. It is preferable that the biggest height and the width of the bottoms is no more than 200 μm (microns).

This embodiment also provides a backlight module and a liquid crystal display device thereof incorporating with the above-mentioned prism sheet of the same structure as in the above-mentioned embodiment and the corresponding description is omitted. Besides the above-mentioned prism sheet, the backlight module may include optical elements such as a light guide plate, a diffusion plate and the like, light sources (cold cathode fluorescence lamps or light-emitting diodes), a reflective plate, and so on. This prism sheet may be provided on the light guide plate. The backlight module may be a side-illuminating type or a direct illuminating type. Besides the backlight module, the liquid crystal display may further comprise a liquid crystal panel, a fixing frame and the like, and the backlight module may be mounted behind or below the liquid crystal panel.

In this embodiment, two sub-prism sheets are bonded as an integrated prism sheet, which avoids scratches between the prism sheets when they are assembled, and also avoid unstable engagement for example between a reverse prism sheet and a prism structure on a light guide plate; furthermore, the regular protrusions on the first sub-prism sheet produces an excellent effect of light concentration as prism optical elements, and irregular protrusions on the first sub-prism sheet can effectively solve Mura effects.

In this embodiment, the protrusions of the prism sheet can have intervals between the adjacent protrusions. Such intervals have different sizes from those of the gaps between pixel dots in a pixel area (or display area) of a liquid crystal panel, so as to prevent from producing an optical interference phenomenon with pixel units, i.e., a phenomenon of uneven brightness among pixels. Furthermore, the intervals between the adjacent protrusions can be provided in a range of 25 μm~50 μm. It is proved by experiments that, when the intervals between the adjacent protrusions are in a range of 25 μm~50 μm, they are not only convenient to be produced, but also can achieve an excellent effect of light concentration; moreover, they may have different sizes from that of the gaps between pixel dots in a pixel area of most liquid crystal panels in the related art, which in turn can prevent optical interference phenomenon from occurring. Furthermore, the sizes of intervals may different with each other, which can better prevent pixel units from producing an optical interference phenomenon.

Furthermore, the protrusions of the prism sheet can also be one or more of the stripe-shaped, prismoid-shaped, pyramid-shaped, truncated cone-shaped, conical-shaped or sphere crown-shaped protrusions and any combinations thereof.

The above description is only a specific mode for carrying out the present disclosure, but not limiting the protection scope of the present disclosure. Any modifications and alternations within the technical scope disclosed by the present disclosure, which are easily to be envisaged by any one well skilled in the art, should be included in the protection scope of the present disclosure. Therefore, the protection scope of the present disclosure should be defined with the protection scope of the appended claims as a criterion.

What is claimed is:

1. A prism sheet, comprising:
a first sub-prism sheet and a second sub-prism sheet with surfaces being closely bonded with each other,
wherein the first sub-prism sheet has a plurality of protrusions on the surface being bonded with the second sub-prism sheet, and the second sub-prism sheet has recesses on the surface being bonded with the first sub-prism sheet corresponding to the protrusions, and
wherein the first sub-prism sheet and the second sub-prism sheet are made of materials having different refractive indexes from each other,
wherein the adjacent protrusions have intervals in a range of 25 μm~50 μm therebetween.

2. The prism sheet according to claim 1, wherein the first sub-prism sheet and the second sub-prism sheet are bonded together by processes of coating ultraviolet curing adhesive and then curing the adhesive by UV rays.

3. The prism sheet according to claim 1, further comprising a substrate closely bonded with a bottom surface of the first sub-prism sheet.

4. The prism sheet according to claim 3, wherein the substrate is a light guide plate.

5. The prism sheet according to claim 4, wherein the substrate and the first sub-prism sheet are integrally formed.

6. The prism sheet according to claim 3, wherein the substrate and the first sub-prism sheet are integrally formed.

7. The prism sheet according to claim 1, wherein the protrusions are stripe-shaped protrusions with rectangular bottoms and triangular cross-sections.

8. The prism sheet according to claim 7, wherein the triangles of the cross-sections of the stripe-shaped protrusions are equilateral triangles, with the length of side of no more than 200 μm.

9. The prism sheet according to claim 7, wherein the protrusions are irregular protrusions.

10. The prism sheet according to claim 1, wherein the protrusions are spherical-shaped protrusions with circular or regular hexagonal bottoms, or the protrusions are pyramid-shaped protrusions with polygonal bottoms.

11. The prism sheet according to claim 10, wherein a height and a width of the bottoms of the protrusions are no more than 200 μm.

12. The prism sheet according to claim 10, wherein the protrusions are irregular protrusions.

13. A backlight module, comprising the prism sheet according to claim 1.

14. A liquid crystal display device, comprising the backlight module according to claim 13.

* * * * *